US010302250B1

(12) United States Patent
Giraldo

(10) Patent No.: US 10,302,250 B1
(45) Date of Patent: May 28, 2019

(54) STABILIZED TOP REMOVAL SYSTEM

(71) Applicant: Mateo Giraldo, Frisco, TX (US)

(72) Inventor: Mateo Giraldo, Frisco, TX (US)

( * ) Notice: Subject to any disclaimer, the term of this patent is extended or adjusted under 35 U.S.C. 154(b) by 84 days.

(21) Appl. No.: 15/686,736

(22) Filed: Aug. 25, 2017

Related U.S. Application Data

(60) Provisional application No. 62/380,128, filed on Aug. 26, 2016.

(51) Int. Cl.
*B60J 11/00* (2006.01)
*F16M 13/02* (2006.01)

(52) U.S. Cl.
CPC ............ *F16M 13/022* (2013.01); *B60J 11/00* (2013.01); *F16M 13/027* (2013.01)

(58) Field of Classification Search
CPC ...... F16M 13/022; F16M 13/027; B60J 11/00
See application file for complete search history.

(56) References Cited

U.S. PATENT DOCUMENTS

| | | | | | |
|---|---|---|---|---|---|
| 1,021,585 | A | * | 3/1912 | Ewert | B66C 23/94 212/223 |
| 1,298,508 | A | * | 3/1919 | Jerome | E04O 3/005 254/338 |
| 4,600,177 | A | * | 7/1986 | Fritz | B60J 7/106 254/338 |
| 4,830,427 | A | * | 5/1989 | Fiocchi | B60J 11/00 135/90 |
| 5,263,687 | A | * | 11/1993 | Garbiso | B60J 11/00 248/327 |
| 5,897,104 | A | * | 4/1999 | Garbiso | B66C 1/18 248/327 |
| 5,984,275 | A | * | 11/1999 | Hoslett | B60J 11/00 248/327 |

* cited by examiner

*Primary Examiner* — Anita M King
(74) *Attorney, Agent, or Firm* — Eldredge Law Firm, LLC; Richard Eldredge; Beth Felix

(57) ABSTRACT

A system for lifting and lowering a roof of a vehicle. The system includes a lifting device secured to an external structure; a plurality of pulley selectively positioned above the roof of the vehicle, the plurality of pulleys includes a first and second pulley positioned at a rear section of the roof; a third and fourth pulley positioned at a front section of the roof; a fifth and sixth pulley positioned between the first and second pulley and the third and fourth pulley; and a center pulley positioned between the first and sixth pulley and the third and fourth pulley. The system further includes a line secured to the lifting device, the line includes a first section passing through both the first and second pulley for lifting the rear section of the roof; a second section passing through the center pulley and through the fifth and sixth pulley for lifting the front section of the roof. The system further includes a first tension device secured to the first section of the line; a second tension device secured to the second section of the line; a first hook secured to the first section of the line; and a second hook secured to the second section of the line.

1 Claim, 3 Drawing Sheets

STABILIZED TOP REMOVAL SYSTEM

BACKGROUND

1. Field of the Invention

The present invention relates generally to automobile care systems, and more specifically, to an automobile top removal system for detaching or storing the removable roof of a vehicle.

2. Description of Related Art

Automobile care systems are well known in the art and are effective devices to maintain a vehicle or parts thereof. For example, FIG. 1 depicts a conventional automobile top removal system 101 having four attachment lines 103 joined to one lift line 105, an automobile 107, a removable roof 109, a pulley 111 and a user 113. During use, attachment lines 103 are placed at different points on roof 109, lift line 105 is feed through pulley 111 and pulled on by user 113 to remove roof 109 from automobile 107.

One of the problems commonly associated with system 101 is its limited use. For example, lift line 105 fails to prevent roof 109 from rotating after removed from the automobile 107 potentially damaging the roof 109 or harming the user 113. Additionally having the attachment lines 103 join lift line 105 at one location makes it difficult to attach all four lines to the roof 109 without them slipping or coming off the roof 109.

Accordingly, although great strides have been made in the area of automobile top removal systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
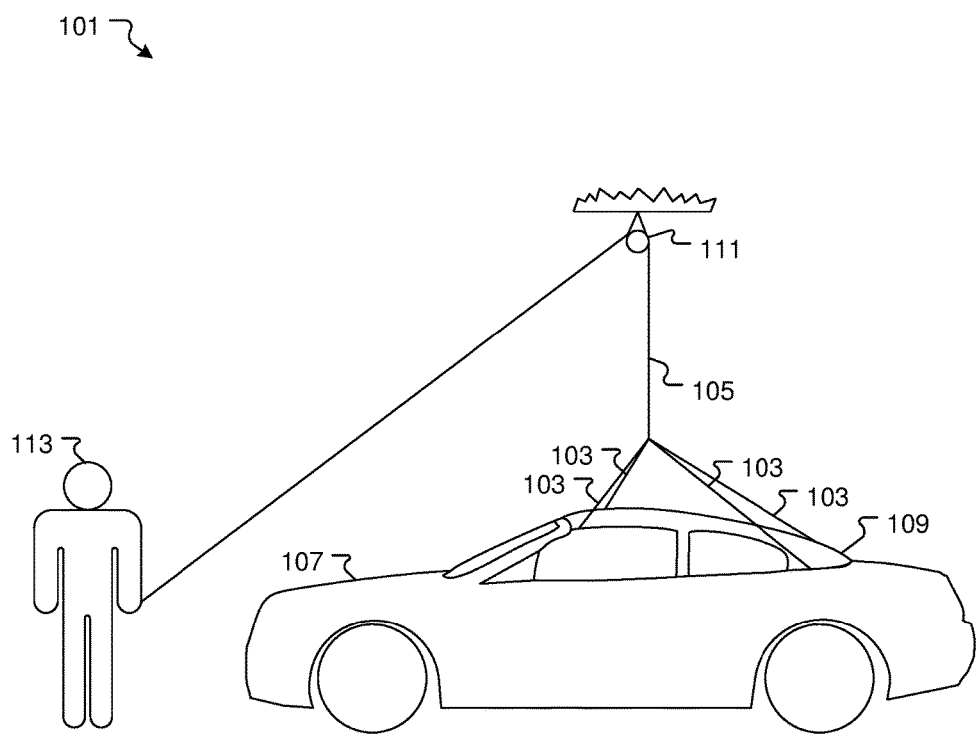
FIG. 1 is a side view of a common automobile top removal system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional automobile top removal systems. Specifically, the system of the present application enables the removal of a top by a single user while minimizing the risk of damage or injury. In addition, the system provides devices to securely hold the roof without slippage or becoming disconnected while being attached. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
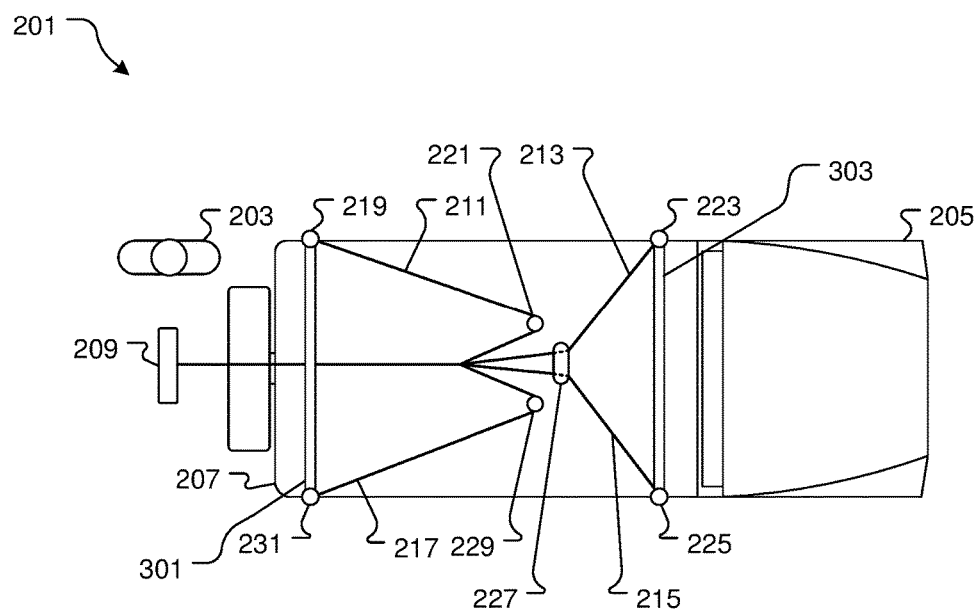
FIG. 2 is a top view of a stabilized top removal system in accordance with a preferred embodiment of the present application.
Figure 3:
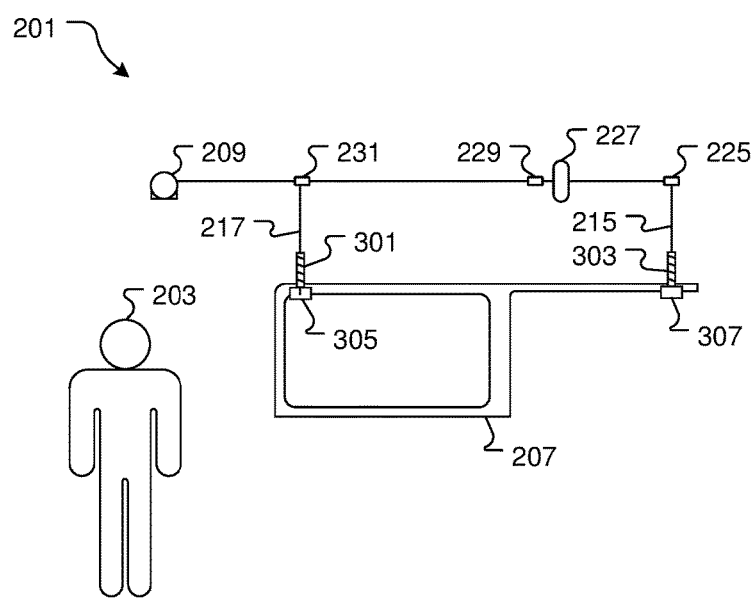
FIG. 3 is s side view of a top and attachment lines of FIG. 2.

Referring now to the drawings wherein like reference characters identify corresponding or similar elements throughout the several views, FIG. 2 depicts a top view and FIG. 3 a side view of a stabilized top removal system in accordance with a preferred embodiment of the present application. It will be appreciated that system 201 overcomes one or more of the above-listed problems commonly associated with conventional automobile top removal systems.

In the contemplated embodiment, system 201 comprises one or more users 203, one or more automobiles 205 with one or more tops 207, one or more lifting devices 209 in communication with three or more attachment lines 211, 213, 215, 217 each having one or more tension device 301, 303 (See FIG. 3) and one or more hooks 305, 307 (See FIG. 3), attachment lines 211, 213, 215, 217 passing through one or more redirecting devices 219, 221, 223, 225, 227, 229, 231. In use hooks 305, 307 are placed under the edge of top 207, tension devices 301, 303 keep hooks 305, 307 from moving while user 203 places all the hooks 305, 307 in position, user 203 activates lifting devices 209 to retract the attachment lines 211, 213, 215, 217 to remove top 207 from automobile 205 and stores it. In one of the preferred embodiments, the redirecting devices is a plurality of pulleys configured to direct the attachment lines in a specific direction.

It should be appreciated that one of the unique features believed characteristic of the present application is that redirecting devices 219, 221, 223, 225, 227, 229, 231 allow attachment lines 211, 213, 215, 217 to be placed directly over their intended lifting points for top 207 and prevent rotation during and after lift. It will be appreciated that the configuration of redirecting devices 219, 221, 223, 225, 227, 229, 231 and attachment lines 211, 213, 215, 217 could vary depending on the style of top 207 and that all configurations are contemplated. It will also be appreciated that lifting devices 209 and redirecting devices, e.g., pulleys 219, 221 positioned near the rear of the roof; pulleys 223, 225 positioned near the front of the roof; a center pulley 227; and two additional pulleys 229, 231 could be supported by an external structure such as the roof of a garage, independent structural members, or any other devices of support and not deviated from the intent of this disclosure.

Another unique feature believed characteristic of the present application is tension device 301, 303 and hooks 305, 307 that facilitate joining attachment lines 211, 213, 215, 217 to top 207. It is contemplated and will be appreciated that while tension devices 301, 303 are depicted as separate parts that they could be combined with attachment lines 211, 213, 215, 217 without deviating from the intent of this disclosure. It is also contemplated and will be appreciated that hooks 305, 307 could be coated with or made from material that does not scratch or damage top 207, and that hooks 305, 307 can comprise any devices for gripping top 207, e.g., brackets, grips, and the like. The plurality of hooks are equally spaced apart from each other via tension device 301, 303, which in the preferred embodiment could extend the length of the roof top. The tension devices are therefore effect means to easily and rapidly set the hooks in the desired location for lifting and lowering the roof. In one embodiment, the tension devices are elongated rods.

Figure 4:
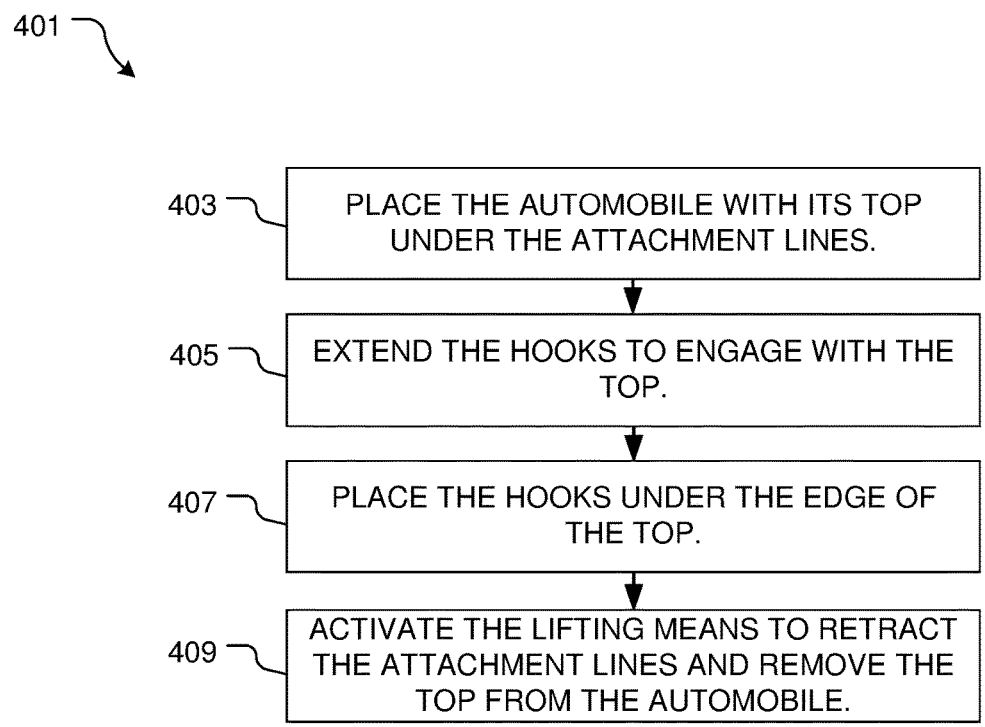
FIG. 4 is a diagram of the preferred method of use of the system of FIGS. 2 and 3.

Accordingly, during use the user 230 activates the electric lifting device 209 having a spool that winds the attachment lines to lift the roof. The redirecting device, e.g., pulleys, and held in a stationary position and Referring now top FIG. 4 the preferred method of use of system 201 is depicted, method 401 comprising placing the automobile with its top under the attachment lines 403, extending the hooks to engage with the top 405, placing the hooks under the edge of the top 407, activating the lifting devices to retract the attachment lines and remove the top from the automobile 409.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for lifting and lowering a roof of a vehicle, comprising:
    a lifting device secured to an external structure;
    a plurality of pulleys selectively positioned above the roof of the vehicle, the plurality of pulleys having:
        a first and second pulley positioned at a rear section of the roof;
        a third and fourth pulley positioned at a front section of the roof;
        a fifth and sixth pulley positioned between the first and second pulley and the third and fourth pulley; and
        a center pulley positioned between the first and sixth pulley and the third and fourth pulley;
    a line secured to the lifting device, the line having:
        a first section passing through both the first and second pulley for lifting the rear section of the roof;
        a second section passing through the center pulley and through the fifth and sixth pulley for lifting the front section of the roof;
    a first tension device secured to the first section of the line;
    a second tension device secured to the second section of the line;
    a first hook secured to the first section of the line; and
    a second hook secured to the second section of the line.

* * * * *